T. Brooks,
Centering Chuck,
N°. 50,329. Patented Oct. 10, 1865.
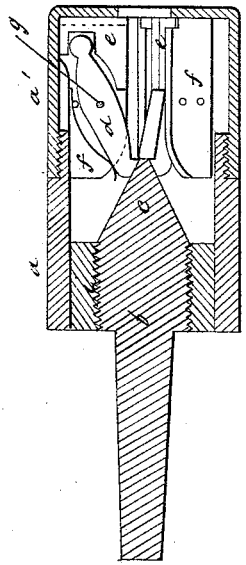
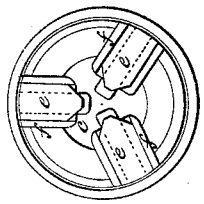
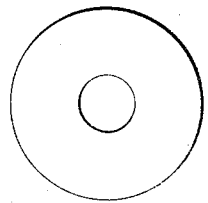
Witnesses
E. W. Bliss
Jeremy W. Bliss
Inventor:
Thomas Brooks
By Jeremy W. Bliss

UNITED STATES PATENT OFFICE.

THOMAS BROOKS, OF MIDDLETOWN, CONNECTICUT.

SELF-CENTERING CHUCK.

Specification forming part of Letters Patent No. 50,329, dated October 10, 1865.

*To all whom it may concern:*

Be it known that I, THOMAS BROOKS, of Middletown, county of Middlesex, and State of Connecticut, have invented a certain new and useful Improvement in Self-Centering Chucks; and I do hereby declare that the same is described and represented in the following specification and drawings.

To enable others skilled in the art to make and use the same, I will proceed to describe its construction and operation, referring to the drawings, in which the same letters indicate like parts in each of the figures.

The nature of this improvement will be understood from the specification and drawings, the object of which is to so arrange and operate upon the griping-jaws as to cause them to work in a vertically-diverging line with the spindle of the chuck, by means of horizontal levers in combination with a conical screw-spindle or its equivalent, so that the face of the chuck shall always present a true, even surface.

The case $a$ of this chuck is made in two parts, and is designed to be screwed together at or near its center. The shank of the spindle $b$ is designed to fit the orifice of a lathe-spindle in which it is to be used, the outer end, $c$, of which is made conical shape, so as to operate as an incline plane or cam upon and throw open the inner ends of the levers $d$, which operate the vertically-working jaws $e$. The boxes or guideways $f$ are made in or secured firmly to the case $a$, the outer ends of which are planed or otherwise properly fitted in true vertically-diverging lines to the center. The jaws $e$ are made of the proper shape, substantially as shown, having flanges on each side of their faces, and are fitted properly into the ends of the guideways $f$. The levers $d$ are made in the shape nearly as shown, and fitted into the guideways, and secured by a bolt or pin, $g$, so as to work closely and freely therein, one end of which is fitted into the opening in the back of the jaws, and the others take their bearing on the cam or conical-shaped end of the spindle $b$. The jaws $e$ are fitted into and flush with the ends of the guideways $f$, so that when the cap or case $a'$ is placed over the mechanism and screwed to its place the flange of the jaws $e$ will work against or between the inside end face-plate and the ends of the guideways $f$.

The springs $h$ may be secured to the inside of the case $a$ and take their bearing against the inner ends of the jaws, or they may be secured to the end of the jaws and take their bearing against the inside of the case. The object of these springs is to throw open the jaws as the gripe is relaxed, by turning the chuck off from the screw $i$. Now, when the spindle $b$ of this chuck is fitted to a spindle of a lathe in which it is to be used, the jaws $e$ may be easily and quickly adjusted firmly to the article which is to be held thereon by turning the chuck itself onto the screw $i$.

It seems to be quite apparent that when this article in all its detail is properly adjusted and skillfully executed, it will take a more firm gripe, without the liability of relaxing its hold, (until desirable,) than any other now in use.

I believe I have thus shown the nature, construction, and advantage to be derived from this improvement so as to enable others skilled in the art to make and use the same.

I claim—

The pivoted levers $d$, with the sliding jaws $e$, and conical screw-spindle $c\ i\ b$, all constructed substantially as and for the purpose described.

THOMAS BROOKS.

Witnesses:
 E. W. BLISS,
 JEREMY W. BLISS.